United States Patent [19]

Kesner

[11] Patent Number: 4,633,446
[45] Date of Patent: Dec. 30, 1986

[54] SCROLLING WELL LOGGING DATA DISPLAY METHOD AND APPARATUS

[75] Inventor: Burice E. Kesner, Stafford, Tex.

[73] Assignee: Dresser Industries, Inc., Dallas, Tex.

[21] Appl. No.: 518,246

[22] Filed: Jul. 28, 1983

Related U.S. Application Data

[63] Continuation of Ser. No. 272,402, Jun. 10, 1981, abandoned, which is a continuation of Ser. No. 30,058, Apr. 13, 1979, abandoned.

[51] Int. Cl.$^4$ ............................................. G01V 1/34
[52] U.S. Cl. ...................................... 367/69; 340/724; 340/736
[58] Field of Search ............... 340/736, 739, 740, 724, 340/726; 367/28, 30, 33, 68, 69, 71; 346/33 WL

[56] References Cited

U.S. PATENT DOCUMENTS

| | | | |
|---|---|---|---|
| Re. 31,773 | 12/1984 | Foley et al. | 340/726 |
| 2,651,027 | 10/1953 | Vogel | 340/18 |
| 3,257,639 | 6/1966 | Kokesh | 340/18 |
| 3,566,478 | 3/1971 | Hurlston | 33/142 |
| 3,653,027 | 3/1972 | Scheer | 340/324 A |
| 3,750,009 | 7/1973 | Baker | 324/1 |
| 3,750,098 | 7/1973 | Zill | 340/18 CM |
| 3,768,093 | 10/1983 | Day | 340/324 A |
| 3,991,611 | 11/1976 | Marshall, III et al. | 73/151 |
| 4,010,476 | 3/1977 | Elliott | 346/1 |
| 4,012,712 | 3/1977 | Nelligan | 340/18 CM |
| 4,020,451 | 4/1977 | Elliott | 367/33 |
| 4,276,599 | 6/1981 | Timmons et al. | 367/30 |
| 4,284,988 | 8/1981 | Seitz et al. | 340/726 |

OTHER PUBLICATIONS

"Wellsite Computer Analysis: A Program for Complex Lithologies"—GO Wireline Services Abstract, first paragraph and Figure 1.
"Wellsite Formation Analysis Using the DDL Computer"—Gearhart-Owen Abstract, first paragraph p. 2, Wellsite Computer Logs Laserlog System, first four paragraphs and Figure 2.
"The Cyber Service Unit—An Integrated Logging System" p. 2, left column Optical Recorders: p. 3, left column, The Optical Recorder: p. 4, right column, Optical Monitor, and Figures 1, 4, 5 and 6-Schlumberger.
"Direct Digital Logging" inside cover, pp. 7, 10 and 24,—Gearhart-Owen.
"Field Evaluation of Direct Digital Well Logging-"—Gearhart-Owen Abstract, last paragraph, and Figures 1, 3 and 5.

Primary Examiner—Thomas H. Tarcza
Assistant Examiner—Ian J. Lobo
Attorney, Agent, or Firm—Patrick H. McCollum

[57] ABSTRACT

An improved method and apparatus for displaying visual indications of subsurface-derived earth measurements. Digital logging measurements are delivered to video circuits for graphic display. The video circuitry includes a cathode ray tube and digital processing circuitry whereby an image is continually scrolled along with depth reference lines in correlation with movement of the sonde through the borehole. A moving visible representation of a preselected portion of the measurement may thus be continuously observed as it is obtained, moving relative to the display to simulate sonde movement within the borehole. A digital memory technique reduces the number of digital co-ordinates required to be stored and time required for visual data and reference line generation and scrolling wherein digital representations of starting co-ordinates are sequentially incremented and displays made in functional response thereto.

3 Claims, 5 Drawing Figures

SCROLLING WELL LOGGING DATA DISPLAY METHOD AND APPARATUS

This application is a continuation of application Ser. No. 272,402, filed June 10, 1981 which is a continuation of application Ser. No. 030,058 filed Apr. 13, 1979, both abandoned.

BACKGROUND OF THE INVENTION

This invention relates to improved methods and apparatus for presenting a video image and the like, and more particularly relates to improved methods and apparatus for visually displaying well logging data and information.

It is well known that petroleum substances are found in subsurface earth formations, and that boreholes are conventionally drilled into such formations for the purpose of recovering these substances. What is not well known, however, is that it is conventional practice to survey the earth materials along the length of the borehole, in order to determine whether one or more of the formations traversed by the borehole contains oil or gas in commercial quantities.

More particularly, a borehole is normally logged by passing a logging tool or "sonde" through the borehole at the end of an electrically conductive logging cable which is connected at its other end to instruments at the surface. The function of the sonde is to electrically detect one or more lithological characteristics of the earth materials immediately adjacent thereto, and the function of the cable is to transmit such detections to the surface as the sonde moves through the borehole. Accordingly, the surface instrumentation will conventionally include provision for indicating the depth of the sonde in the borehole in correlation with receipt of the signals from the sonde, as well as provision for processing and recording such signals.

It is seldom that a single well logging measurement will provide sufficient basis for a conclusive determination as to the presence of petroleum substances in a particular formation of interest. Accordingly, it is essential that the resulting measurement be registered in a permanent manner whereby it can be studied, and whereby all or portions of the measurement may be compared or correlated with other lithological data. Accordingly, various recording devices such as a pen-type chart recorder or a camera have been developed and used for these purposes.

It is also desirable for the well logging system to include means for observing and monitoring the logging measurement as it is being derived from the sonde, inasmuch as this permits the logging operator to adjust and control the system to provide the most accurate and meaningful measurement. The conventional chart-type recorder is particularly desirable in this respect, since the paper chart is easily visible to the operator as the pen moves to draw the log. On the other hand, the resulting paper chart cannot be adjusted once it is produced, nor can the recorder inscribe supplemental data on the chart. Furthermore, duplicates of the measurement cannot be conveniently obtained for correlation with other data, except by tracing the graph onto another sheet of paper or the like.

The camera recorder, which employs a beam of light which moves appropriately across a strip of photographic film, produces a record which can be easily duplicated. However, the strip of film is relatively inaccessible during the logging operation, and therefore does not permit the measurement to be conveniently observed during the course of the logging measurement.

Recently, improved well logging systems and techniques have been developed such as those described in U.S. patent application Ser. No. 949,592, which was filed Oct. 10, 1978, wherein the logging measurements are derived in or converted from analog to digital form, and wherein these measurements may be conveniently recorded using magnetic tape. Although this improvement has provided for easy reproduction of an unlimited number of copies of all or any portion of the measurement, and although this has further permitted the measurement to be easily and conveniently correlated and even combined with other lithological data, the magnetic tape does not itself provide for visible observation of the logging data being stored on the tape as such. Accordingly, it is desirable to include a video-type capability in the logging system whereby the logging measurement may be conveniently observed and monitored by the operator as it is derived from the borehole, and whereby the operator may conveniently control and adjust the system and even portions of the measurements as they are generated.

The video capability includes a cathode ray tube or the like, wherein the screen presents a visible image of at least the most recent 100 feet or other preselected portion of the measurement along the "curve", and also together with a further array of horizontal lines to indicate the depth in the borehole at points along the curve. Thus, the logging measurement will appear as a representation which progresses vertically across the video screen to illustrate passage of the sonde along the borehole between the depths indicated by the horizontal lines on the screen, and the relative horizontal displacement of the curve with respect to the vertical lines on the screen serve to indicate the magnitude of the lithological parameter being derived.

As more effective methods are discovered for deriving a plurality of different measurements during the same logging "trip" through the borehole, thus the need to observe these measurements as they are derived and magnetically recorded in a correlative manner is even more important for the reasons hereinbefore set forth. Moreover, the advent of logging systems wherein the measurements are recorded on magnetic tape, has enhanced the need for a video capability to display these measurements to the operator in the most meaningful manner.

It will be apparent that a video capability that will not only accumulate and present an image representing a full preselected segment of the logging measurement, but which will further scroll the image in correlation with travel of the sonde to continually present a full preselected portion of the measurement at all times, would be far more useful to the operator. If it is assumed that the video screen is composed of an array of 400 lines, each line in turn being composed of 512 points or "stations", however, it will also be readily apparent that this, in turn, would call for a memory capability sufficient to store a total of 204,800 "X-Y" coordinates. More important, it would require a scanning and selection capability which would continually recall and display each of these coordinates at a rate which would be fast enough to avoid producing a flickering image on the video screen.

These disadvantages are overcome with the present invention, however, and novel video display means and method are provided for presenting a scrolling image which is not only continually representative of a full preselected length of logging measurement, but which also eliminates the need for elaborate and high-speed storage, or storage-type oscilloscopes and the like to avoid flicker.

SUMMARY OF THE INVENTION

In a particularly suitable embodiment of the present invention, a well logging system is provided of the type depicted and described in the aforesaid U.S. patent application Ser. No. 949,592, having a video capability for presenting an image which not only includes an array of vertical and horizontal index lines as desired, but which continually produces a visible curvilinear representation of a full preselected section of the logging measurement in conventional form. More particularly, means are provided to cause both the index lines and the curve to travel across the video screen in response to incoming logging data being provided by the sonde as it passes along the borehole, whereby the image being presented is caused to more realistically and accurately illustrate the logging operation being performed.

As will hereinafter be explained in detail, the video screen will initially generate the image of the logging curve in a progressive manner to illustrate passage of the sonde through the initial portion of the logging operation. Upon completion of this step, however, the image will not erase as in the case of other forms of video display, but will begin to scroll across the screen so as to continue to illustrate the last 100 feet (for example) of logging mesurement being obtained. More particularly, that portion of the image corresponding to the horizontal index lines on the video screen will also "scroll" in conjunction with the logging curve or curves, at a rate corresponding with passage of the sonde along the borehole, until the logging operation has been completed.

As will also hereinafter be described in detail, scrolling by means of the present invention is preferably achieved by the use of separate and different means and methods for creating and scrolling the array of indexing lines in the video image, in contrast with creating and scrolling the logging curve portion of the image. Referring first to the array of index lines, these are preferably provided by a storage which establishes the necessary fixed X and Y coordinates whereby these same coordinates are drawn from the storage each time the image is sought to be generated on the screen. Scrolling of this portion of the image is achieved, however, by merely adjusting the Y coordinates by one depth increment for each newly derived sample to be presented before the image is actually applied to the video screen, such depth increments being derived as a direct function of movement of the sonde through the borehole. Accordingly, this eliminates the need for a storage capacity for the entire possible number of coordinates, and further eliminates any delay which will inherently result from a need to sample through or calculate such a large number of different locations in the storage each time the image is to be presented.

With respect to the portion of the image which is the logging curve, it will be apparent that such a technique is not appropriate since the sonde is continually providing new additional data rather than merely changing one of the coordinates of a preselected quantity of data. Accordingly, instead of changing the Y coordinate for any of the data being extracted from the storage for display, the memory address for the logging curve merely substitutes in memory each newly received increment of logging data for the oldest bit of data then in the storage, and thereafter selects and applies to the video display the various increments of logging data according to their relative seniority in the storage. More particularly, each bit of data in the logging curve storage capability will always be selected and read out when generating the logging curve portion of the image, but this will occur in a sequence of seniority beginning with the oldest data then in the storage and ending with the newest.

In summary, the preferred embodiment of the present invention will follow a four step sequence for receiving and displaying data, wherein the first step comprises the receiving and storage of data, which may include a portion of logging signals or initial information related to the desired overall appearance of the visual images. The second step will comprise the reading from a horizontal line storage all information necessary to display the horizontal lines, followed by the drawing of all such lines after appropriate adjustment of their Y coordinates when necessary to compensate for newly derived data, whereby the index lines are caused to be displayed in a scrolling manner. In the third step of the sequence, and in like manner, all information necessary to display the vertical lines will be read from a vertical line storage and then drawn, no correlative adjustment of the X coordinates being necessary in that vertical lines will normally not be scrolled.

In the fourth step of the sequence, the logging data storage is sampled in the manner hereinbefore described, and the stored data is then also applied to the display to provide a scrolling representation of the logging curve portion of the image. The system will then recycle to the first state and be held in suspense while the next incoming bit or portion of logging signal is received and applied to the logging data storage in the manner described, whereupon the four steps are repeated as the sonde continues to progress through the borehole.

Although the index lines of the displayed image are derived and scrolled independently of the logging portion of the image, it will be clearly apparent that both portions must be scrolled in coordination with each other. It should be noted that this is inherently accomplished in the present invention, however, since both scrolling functions are derived from or dependent upon derivation of new measurements correlative to movement of the sonde in the borehole.

Accordingly, it is a feature of the present invention to provide an improved well logging system and method, whereby graphical images of logging measurements are displayed at locations having a spatial relation on a viewing screen correlative to the depths within the borehole at which they were derived, and then caused to scroll in functional relation to derivation of additional measurements at different depths. In a particularly suitable embodiment of the present invention, measurements taken over an increment of borehole of one or more well logging parameters are displayed progressing from the shallowest-derived measurements at the top of the screen to the deepest-derived measurements at the bottom. As newly derived measurements at still shallower depths are made, they appear first at the top of the viewing screen, and then move across the screen along with measurements taken at other depths in response to still shallower measurements appearing at the top of the screen, and are eventually removed at the other extremity of the screen.

It is another feature of this invention to facilitate monitoring of the logging operation by providing a visual representation of the movement of the sonde through the borehole as measurements are being derived.

It is a further feature of the present described invention to provide a continuous display of measurements derived over a preselected increment of the borehole, whereby newly arriving measurements may continually be observed in comparison with those measurements previously derived from the immediately preceding increment of the borehole.

It is a further feature of the present invention to provide a simplified memory technique wherein the number of data coordinates required to be stored has been greatly reduced. In a particularly suitable embodiment of the present invention, a given family of grid lines is uniquely defined in memory by the starting coordinates of each line, and the desired length and number of lines, rather than by storing coordinates of each point on every line in memory.

It is also a feature of the present invention to provide a novel technique for scrolling the horizontal or "depth" lines as well as scrolling the displayed image of logging measurements in functional relationship to the display of additional logging measurements on the screen. Accordingly, provision is made for adjusting fixed Y coordinates of depth lines which are stored in memory in functional relation to the derivation of additional logging measurements so as to cause these adjusted Y coordinate values to cause the depth lines to appear to scroll on the visual display to the proper new locations. In like manner, a novel technique for scrolling the images of logging measurements is provided wherein measurements are stored at memory locations correlative to the depths at which the measurements were derived, and wherein newly derived measurements are stored at memory locations previously occupied by the oldest derived data.

It is a specific feature of the present invention to provide a method of investigating the lithological character of subsurface earth materials traversed by a borehole, comprising deriving a measurement of at least one lithological parameter of said materials at a plurality of different depths in said borehole, establishing a plurality of functionally associated linear and electrically responsive indicating stations, selecting and producing at a first one of said stations a visible electric representation of said measurement at a first one of said depths during a first discrete time interval, and selecting and producing at said first one of said stations a visible electric representation of said measurement at a second one of said depths during a second discrete time interval while reproducing at a second one of said stations a visible electric representation of said measurement at said first one of said depths.

It is another specific feature of the present invention to provide a system for investigating the lithological character of subsurface earth materials traversed by a borehole, comprising logging means for electrically measuring said materials at a plurality of different depths along said borehole, display means having a viewing screen composed of a plurality of different separate discrete image stations for receiving and presenting a graphical representation of electrical signals, and signal processing means interconnecting said logging means and said display means for presenting a measurement of said materials at a selected depth at a plurality of said image stations in functional response to movement of said logging means along the depth of said borehole.

These and other features and advantages of the present invention will become apparent from the following detailed description, wherein reference is made to the figures in the accompanying drawings.

IN THE DRAWINGS

DETAILED DESCRIPTION OF THE DRAWINGS

Figure 1:
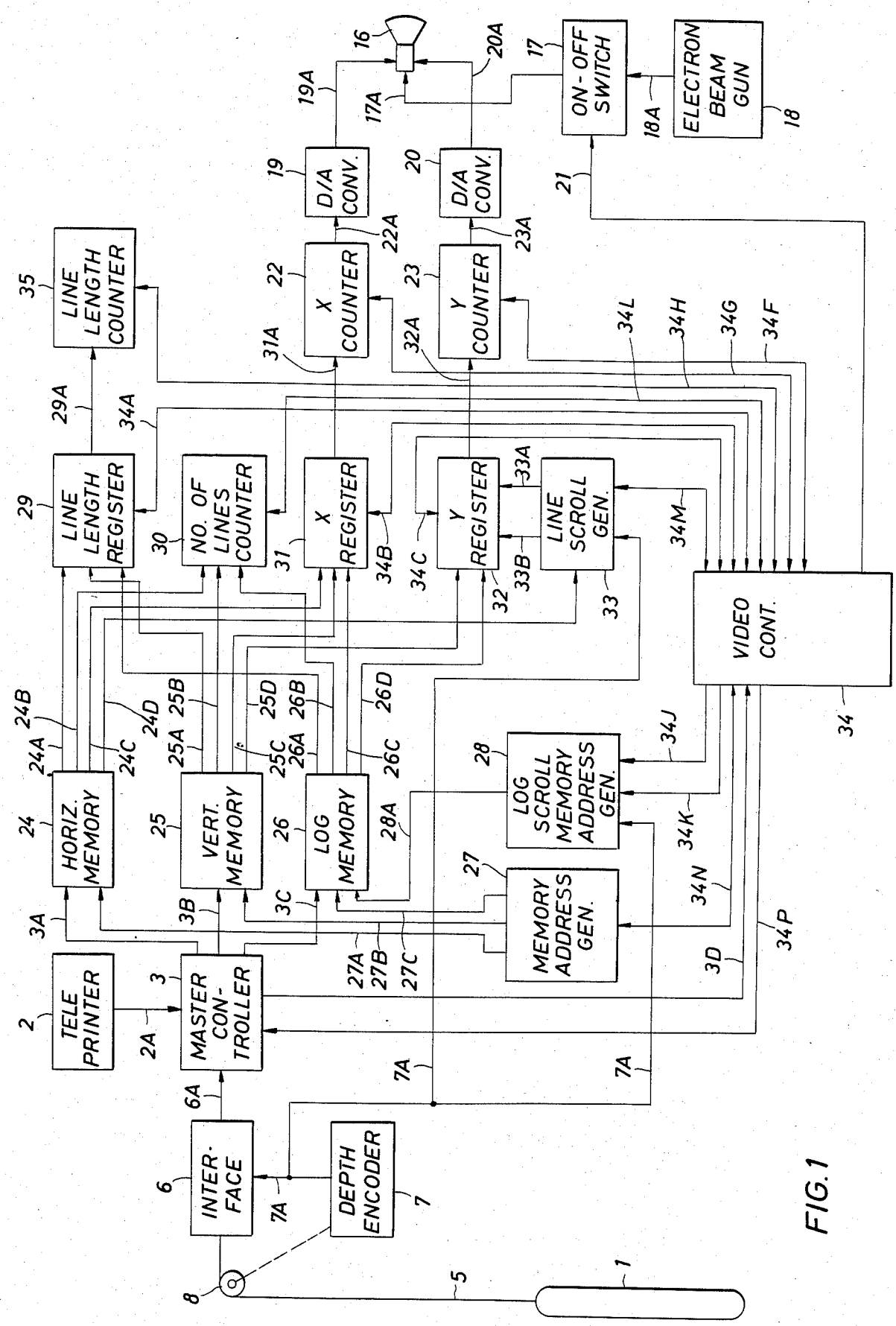
FIG. 1 is a simplified functional representation of an embodiment of the present invention.

Referring now to FIG. 1, there may be seen a sonde 1 of a type suitable for providing logging measurements of subsurface earth materials traversed by a borehole, means such as a conventional teleprinter 2 for suitably conditioning the system herein depicted, and a master controller 3 which is responsive to the information received from the sonde 1 and teleprinter 2.

Referring more particularly to the measurements provided by the sonde 1, from FIG. 1 it may be seen that these measurements are conventionally delivered by means of a logging cable 5 to an interface 6 where they will be appropriately conditioned as required by conversion from analog to digital form, for example, prior to delivery on interface output 6a to controller 3. In a conventional logging operation, however, it is necessary to correlate these measurements to the depths at which they were derived within the borehole. Accordingly, a depth encoder 7 may be provided for generating depth increment signals 7a functionally related to movement of the sonde 1 within the borehole. This may be achieved by generating increment signals 7a correlative to rotation of a shive wheel 8, which, in turn, is related to movement of the cable 5 over the wheel 8 as the cable raises the sonde 1 from within the borehole. It may be appreciated from FIG. 1 that the increment signal 7a thus generated and delivered to the interface 6 may be used to achieve correlation of logging measurements to depth by two methods. First, the interface 6 may be designed so as to pass "free running" measurements being continuously derived by the sonde 1 to the controller 3 in response to the increment signal 7a. Secondly, the interface 6 may be designed to generate and transmit a depth command signal in response to the increment signals 7a on cable 5 in the manner previously described in U.S. patent application Ser. No. 949,592 which was filed Oct. 10, 1978, whereby measurements will be derived by the sonde 1 and transmitted to the surface on cable 5 and to the controller 3 in response to these increment signals 7a. In either case, the controller 3 will preferably be receiving a series of logging measurements, each of which may be correlated in a manner to be described to the depth at which they were derived by means of the increment signals 7a.

Figure 2A:
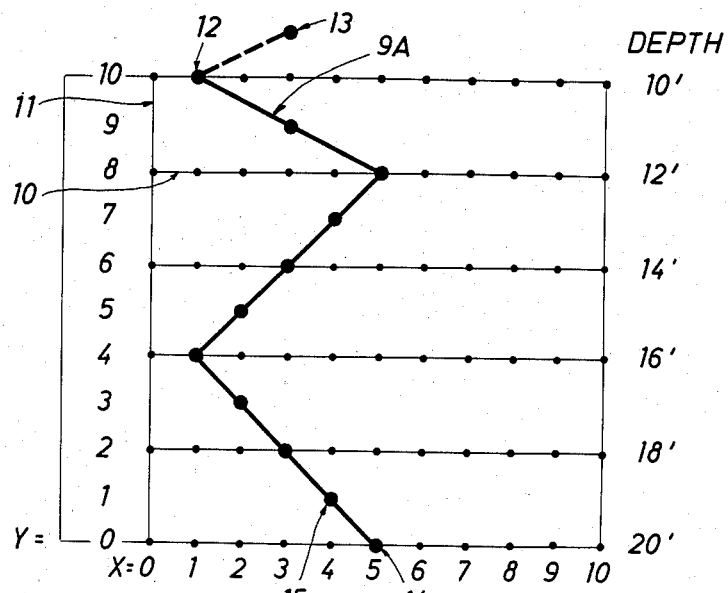
FIG. 2A is a simplified pictorial representation of a one form of visual representation of a typical well logging measurement of the character provided by the structures depicted in FIG. 1.
Figure 2B:
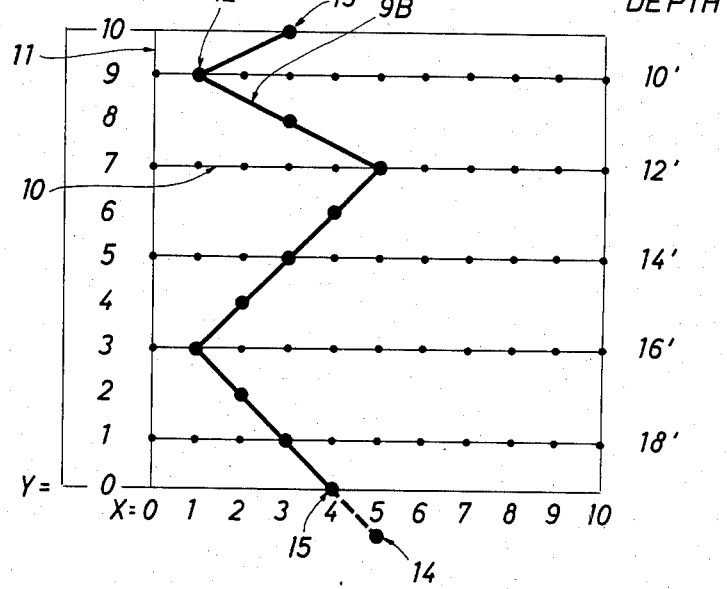
FIG. 2B is another simplified pictorial representation of the type depicted generally in FIG. 2A.

Referring now to the particular graphical images of logging information created by the present invention in response to the information supplied by the sonde 1 and teleprinter 2, as previously noted, there will be seen depicted in FIGS. 2A and 2B simplified pictorial representations typical of two successive such images. While these images and numbers depicted therein will be used to illustrate operation of the present invention, it should be noted that other images and correlative numbers may be used alternatively. The first image depicted in FIG. 2A illustrates the display of a logging curve 9a comprised of logging measurements derived by the sonde 1 at every foot as it traverses a preselected 10 foot increment of borehole from 20 to 10 feet. There will also be seen a series of horizontal "depth" lines 10 displayed at every even numbered depth interval within the 10 foot increment composed of 11 stations each, depicted as dots, as well as a vertical line 11 comprised of 11 such stations or dots. It will be appreciated that the purpose of depth lines 10 and the vertical line 11 is to provide appropriate reference points from which to determine the depth at which a particular measurement represented on curve 9a was made, and its relative magnitude, respectively. These depth lines 10 and vertical line 11, as well as the logs 9A and 9B are shown as solid lines for purposes of illustration only. However, it is a matter of choice as to the number of dots of which each may be composed. Thus, by selecting a larger number of dots per inch to display, the various images may appear to approximate continuous lines as closely as desired.

Referring now to FIG. 2B there may be seen a second image again illustrating display of a logging curve 9b, again comprised of 11 logging measurements, as well as depth lines 10 and vertical line 11. However, it will be noted that in FIG. 2B the 11 measurements derived by the sonde 1, while again made at every 1 foot interval over a 10 foot increment within the borehole, were derived over a different increment from 19 to 9 feet in depth, rather than from 20 feet to 10 feet as in FIG. 2A. It may be seen from a comparison of FIGS. 2A and 2B that as the sonde 1 moves from 10 feet to 9 feet within the borehole taking correlative measurements at these respective depths, measurement 12 taken at a 10 foot depth is shifted downward as are all other measurements and replaced at the top of the image by measurement 13 taken at a 9 foot depth. In like manner, the measurement 14 corresponding to measurements by the sonde 1 at 20 feet is removed from the bottom of the display and measurement 15 taken at 19 feet thus becomes representative of the deepest measurement derived by the sonde 1 currently being displayed. As the hereinabove procedure is successively repeated in successively displayed images, wherein a newly derived measurement appears at the top of the display and all other measurements shift downward a correlative amount causing the bottommost measurement to disappear from the display, it will be seen that a "scrolling" image of logging measurements is thus produced simulating traversal of the sonde 1 upward through the borehole. Moreover, the depth lines 10 are also made to scroll correlative to the scrolling of the logs 9a and 9b as to further simulate movement of the sonde 1 and to preserve their value as depth references.

Several things should be noted from the above description of the various images displayed. First, only 11 measurements derived at 1 foot intervals over a 10 foot increment of borehole were displayed, depicting only one well log parameter. Also, depth lines 10 were displayed only at even-numbered depth intervals, and only one vertical line was preented.

In practice, however, these numbers may vary dependent upon the desired resolution of the display and various other considerations. For example, it may be desirable to continuously display a 100 foot increment consisting of measurements taken every one-fourth foot or, in other words, to display 400 vertical points with depth lines 10 displayed at 10 foot increments. This will, accordingly, make the logs 9a and 9b to be more continuous rather than as a series of discreet points, as previously noted, and will facilitate comparison of measurements over a 100 foot increment rather than the 10 foot increment illustrated. Furthermore, measurements may be required at intervals of one-fourth foot or less dependent upon the formations being logged. Still further, it will be apparent that numerous combinations and variations are possible of depth lines 10, vertical lines 11, logs 9a and 9b, and even vertical reference line 11. Moreover, it may also be desirable to display alpha-numeric messages, or symbols such as cross-hatching or the like on the images correlative to the parameters measured, and to cause this data or symbols to scroll as described. Still further, it may be desireable to cause the number of displayed points to vary from one log 9a or set of depth lines 10 to another, or the like.

Referring now again to FIG. 1, the particular technique wherein the hereinbefore described successive images are generated by the present invention will now be described in greater detail. There will first be seen a display screen 16, which may be a conventional cathode ray tube, for converting the signals produced by the display into the desired visible light images such as those depicted in FIGS. 2A and 2B. As previously noted, these images actually consist of a plurality of illuminated dots, each having discreet locations uniquely defined by an X, Y coordinate pair unlike, for example, in conventional "raster" scans well known in the art, such as those employed in televisions and the like. In order to illuminate a particularly described dot, it is only necessary to position a conventional electron beam 17a generated by an electron beam gun 18 at the horizontal and vertical coordinates of the dot by means of a horizontal and vertical deflection signal 19a and 20a, respectively. Moreover, it will be noted that by interrupting the gun output 18a from the gun 18 by means of a switch 17, in response to an intensity control signal 21, the electron beam 17a will also be interrupted such that a particular dot may be either illuminated or extinguished in functional relation to the control signal 21. In FIG. 1, there will also be seen conventional digital X and Y counters 22 and 23, respectively, each having correlative X and Y counter outputs 22a and 23a, which are, in turn, transmitted to respective X and Y digital-to-analog converters 19 and 20. It will thus be appreciated that because counter outputs 22a and 23a are discreet digital words, the correlative analog voltages present as horizontal and vertical deflection signals 19a and 20a will also be discreet analog values, causing the display only of discreet points on screen 16 correlative to counter outputs 22a and 23a. Thus, in order to display desired images, it is only necessary to generate and store sequences of digital X-Y pairs of words, and then to display them by means of X and Y counters 22 and 23 in conjunction with intensity control signal 21 in a manner to be described.

It will be recalled that the display of the present invention generates images in response to information provided from the sonde 1 and the teleprinter 2. Because this information may be required by the display for processing more than once, a memory capacity for selectively storing and retrieving this information is provided. Referring again to FIG. 1, there will be seen horizontal, vertical and log memories 24, 25, and 26, respectively, for this purpose. In order to store information in or retrieve information from memories 24–26, it is necessary to generate and transmit to the memories 24–26 appropriate digital numbers or "address commands" corresponding to each location in a given memory at which it is desired to either store or retrieve the information. Accordingly, a suitable memory address generator 27 and log scroll memory address generator 28 may be provided. In response to a particular horizontal memory address command 27a generated by memory address generator 27, horizontal memory 24 will store or "write" at a correlative memory location within memory 24 any information present on horizontal controller output 3a. If no controller output 3a is present, however, memory 24, in response to address command 27a, will transmit the information present in the correlative memory location of horizontal memory 24 on one of horizontal memory outputs 24a, 24b, 24c or 24d to its respective line length generator 29, number of lines counter 30, X register 31, Y register 32, or line scroll generator 33 in a manner to be described. In like manner, memory address commands 27b and 27c will cause any information present on respective vertical and log controller outputs 3b and 3c to be stored in memory locations of their respective vertical and log memories 25 and 26 at memory locations correlative to the digital words carried on address commands 27b and 27c. Also in like manner, if no information is present on outputs 3b or 3c, address commands 27b or 27c will cause information in correlative memory locations of memories 25 or 26 to transmit this information on vertical and log memory outputs 25a–25d and 26a–26d, respectively, to their respective line length register 29, number of lines counter 30, X register 31, or Y register 32, in a manner also to be described.

In summary, it will be seen that information provided to controller 3 from teleprinter 2 on teleprinter output 2a may be delivered on controller outputs 3a and 3b to their respective horizontal memory 24 and vertical memory 25, and furthermore, may be stored in any memory location of their respective memories 24 and 25 in response to memory addresses delivered to horizontal memory 24 on address command 27a and to vertical memory 25 on address command 27b. Moreover, information thus stored in a particular memory location of memory 24 or 25 may be "readout" or transferred on its correlative horizontal memory output 24a, b, c, or d, or vertical memory output 25a, b, c, or d, to its correlative register or counter be delivering the address command corresponding to the particular memory location to horizontal memory 24 on address command 27a or to vertical memory 25 on address command 27b. Similarly, measurements derived from the sonde 1 may be delivered by controller output 3c to log memory 26 and stored or "written" in a desired memory location determined by the particular address command 27c delivered to logging memory 26. These measurements may also selectively be read from their respective memory location and delivered to the appropriate register or counter in response to their respective address command 27c. It will be noted that an additional address generator, the log scroll memory address generator 28 is provided for delivering an additional address command 28a to log memory 26. The basic function of address command 28a is similar to that of address command 27c in that it permits storage of logging measurements present on controller output 3c in a particular memory location of log memory 26 defined by the digital word carried on address command 28a. Address command 28a is still further similar in function to address command 27c in causing measurements thus stored in a particular memory location of log memory 26 to be delivered to an appropriate register or counter on log memory outputs 26a, b, c, or d, in response to the particular digital word carried on address command 28a. However, address generator 28 and its correlative address command 28a are restricted to providing address commands for log memory 26 only for storing or retrieving measurements generated by the sonde 1, and not for information provided by the teleprinter 2.

The general method whereby an image is produced on screen 16 should now be apparent. For a given image to be "drawn" once on the screen 16, where the image is a composite of discreet dot locations have discreet X and Y coordinate locations, a series of paired digital words must be generated. Each pair is correlative to the X, Y coordinates of a different dot displayed in the image, and the total number of pairs will equal the number of dots comprising the image. In a given pair, the word corresponding to the X coordinate of its correlative dot will be presented as X counter output 22a for conversion by converter 19 to analog form as horizontal deflection signal 19a. Simultaneously, and in like manner, the remaining coordinate of the pair, corresponding to the Y coordinate of the dot, will be presented as Y counter output 23a for conversion by converter 20 to analog form as vertical deflection signal 19a. When deflection signals 19a and 20a are thus present so as to position the election beam 17a at the X, Y coordinates of the particular dot on screen 16 when it appears, the beam 17a is briefly energized by control signal 21. Control signal 21 will command switch 17 to briefly pass gun output 18a through switch 17, thus illuminating the dot which is extinguished with removal of control signal 21. The deflection signals 19a and 20a, in response to the next pair of words of the next dot present on counter outputs 22a and 23a, are permitted to change to their next values without the beam 17a being present, thus avoiding creation of a line on screen 16 between successively drawn dots as the deflection signal 19a and 20a change. It may thus be seen that, in order to generate a desired image, it is only necessary to generate and illuminate as hereinbefore described successive pairs of digital words, each pair of which corresponds to one of the dots comprising the image. Still further, a given image may be "re-drawn" by again illuminating these words pairs. It will thus be appreciated that by doing so at a fast enough rate, for example, every 17 milliseconds, although each dot may be alternately illuminated and extinguished, the image may thus appear to be relatively constant and not to "flicker" noticeably.

It thus remains to be understood the manner in which the hereinbefore noted pairs of digital words are generated. In order to generate an image as hereinbefore described, it is convenient to divide the various functions performed by the present invention into four categories in the order in which they may be performed, namely, the receiving of logging measurements and other information, the generation and scrolling of horizontal lines, the generation of vertical lines, and, finally, the generation and scrolling of logging curves. Specifically regarding, for example, the first function of receiving logging data, it will be recalled that information may be provided from two sources, the teleprinter 2 and the sonde 1. It will be appreciated that prior to displaying logging images, some additional information regarding the desired general appearance of the images and the like must be provided, and this function may conveniently be performed by the teleprinter 2. Such information may include the number of depth lines 10, vertical lines 11, and logs 9a to be displayed, and the like. Referring more particularly, for example, to the function of drawing depth lines 10, it will be noted that to uniquely define a given number of such lines, all that may be required is the starting X and Y coordinates of the first dot of each such line, the desired total number of such lines to be drawn, and their lengths. In a particular embodiment of the present invention, it will be noted that because all data may be displayed as points of light or dots having discreet locations on the screen 16, the desired length of a line may be defined by selecting the total number of dots of which the line will be composed. It will further be noted, that it is desirable, though not necessary, that families of vertical and horizontal lines begin at the same Y and X coordinates, respectively, and therefore only one beginning X coordinate may be required for a family of horizontal lines, for example. In summary, then, regarding the preparation of the display for performing the function of drawing depth lines 10, initial information must be provided and stored in the horizontal memories 24. This information is the desired horizontal line length, number of horizontal lines, X coordinate of the first point on a horizontal line, and the Y coordinate of each horizontal line. It will be appreciated that controller 3 may be adapted to generate this information and provide it to the appropriate controller outputs 3a in suitable digital form, in preparation for storage in horizontal memory 24. Moreover, controller 3 may generate this information in response to data delivered to the controller 3 from input data provided by a human operator, to the teleprinter 2, such as desired horizontal line length, number of horizontal lines, and starting X, Y coordinates of the first dot of the first line from which all other necessary information may be computed by the controller 3.

Referring now to the following Table I, there may seen an illustrative "memory map" or arrangement of memory locations in memories 24-26, wherein data required by the display to perform its various functions may be stored and retrieved. More particularly, it will be seen that memory locations 1-9 have been reserved as the particular locations in horizontal memory 24 wherein the previously mentioned required data for drawing horizontal lines is stored awaiting retrieval. Specifically, referring to the illustrative image depicted in FIG. 2A, location 1 contains the digital word for the number "11", corresponding to the desired number of dots per line which are selected to achieve the desired visual resolution of the horizontal lines. Location 2 contains the digital word for the number "6", corresponding to the number of horizontal lines which are to be displayed. Location 3 contains the digital word for "0" corresponding to the beginning X axis location for all such horizontal lines which, as previously noted, may be identical for the given family of horizontal lines. Finally, it will be seen that locations 4-9 are reserved for the digital representations of the particular Y axis location of each horizontal line, namely, 0, 2, 4, 6, 8, and 10. It will thus be seen that memory locations 1 through 9 contain all information necessary to uniquely define the desired family of horizontal lines depicted in FIG. 2A. Further inspection of the memory location map reveals that memory locations 10-13 contain similar information necessary to define the vertical line of FIG. 2A, and that memory locations 14-16 provide the initial information necessary to define the logging curve 9a of FIG. 2A.

TABLE I

| MEMORY LOCATION | CONTENTS | VALUE | |
|---|---|---|---|
| 1 | Horizontal line length | 11 | Horizontal |
| 2 | Number of horizontal lines | 6 | Lines |
| 3 | X Coordinate of beginning of horizontal lines | 0 | |
| 4 | Y Coordinate of first horizontal line | 0 | |
| 5 | Y Coordinate of second horizontal line | 2 | |
| 6 | Y Coordinate of third horizontal line | 4 | |
| 7 | Y Coordinate of fourth horizontal line | 6 | |
| 8 | Y Coordinate of fifth horizontal line | 8 | |
| 9 | Y Coordinate of sixth horizontal line | 10 | |
| 10 | Vertical line length | 11 | Vertical |
| 11 | Number of vertical lines | 1 | Lines |
| 12 | Y Coordinate of beginning of vertical lines | 0 | |
| 13 | X Coordinate of first vertical line | 0 | |
| 14 | Vertical log curve length | 11 | Vertical |
| 15 | Number of curves | 1 | Logging Curve |
| 16 | Y Coordinate of beginning of log curves | 0 | Measurements |
| 17 | X Coordinate of 11th logging measurement | 1 | |
| 18 | X Coordinate of 10th logging measurement | 3 | |
| 19 | X Coordinate of 9th logging measurement | 5 | |
| 20 | X Coordinate of 8th logging measurement | 4 | |
| 21 | X Coordinate of 7th logging measurement | 3 | |
| 22 | X Coordinate of 6th logging measurement | 2 | |
| 23 | X Coordinate of 5th logging measurement | 1 | |
| 24 | X Coordinate of 4th logging measurement | 2 | |
| 25 | X Coordinate of 3rd logging measurement | 3 | |
| 26 | X Coordinate of 2nd logging measurement | 4 | |

TABLE I-continued

| MEMORY LOCATION | CONTENTS | VALUE |
|---|---|---|
| 27 | X Coordinate of 1st logging measurement | 5 |

The general manner in which data shown in the contents of memory locations 1-9, 10-13, and 14-16 which are present in master controller 3 in response to teleprinter output 2a are stored in and retrieved from their various respective memories 24-26 in response to address commands has previously been described but requires further explanation at this point. Referring to FIG. 1, there will be seen a video controller 34, which, in response to a controller output 3d from controller 3 signifying that controller 3 has data corresponding to that shown in memory locations 1-9, 10-13, and 14-16 ready at its outputs for storage, page 28—now go back to page beginning "controller 34 to controller 3" will generate an enabling signal 34n delivered to memory address generator 27. Address generator 27 will then generate a sequence of address commands 27a which are delivered to horizontal memory 24 and correspond to digital representations of memory locations 1-9. Video controller 34 will also generate a transfer command 34p causing controller 3 to transfer on output 3a to horizontal memory 24 the information shown in memory locations 1-9 of the memory map to their respective memory locations 1-9 in horizontal memory 24. When video controller 34 detects that this task is completed, as indicated by another enable signal 34n transmitted to video controller 34 from memory address generator 27, the video controller 34 will then proceed to cause transfer in like manner of the information in master controller 3 corresponding to the contents shown in the memory map of memory locations 10-13 and 14-16 to their appropriate respective places in vertical and log memory 25 and 26, respectively.

Thus, as with storage of initial information in memory locations 1-9 of horizontal memory 24, the video controller 34 will generate a next enabled signal 34n causing memory address generator 27 to generate a next sequence of address commands 27b, delivered to vertical memory 25. Address commands 27b will be digital representations of memory locations 10-13 and, in like manner to storage in the horizontal memory 24, will cause the information shown in memory locations 10-13 of the memory map which are contained on controller output 3b to be transferred in sequence and stored in correlative memory locations of vertical memory 25 in response to a next transfer command 34p from video controller 34 to controller 3. This process will then be repeated for the log memory 26 so as to store the information indicated in memory locations 14-16 in its correlative memory locations in log memory 26. Once the initial information contained in memory location 1-16 is sequentially stored in memories 24-26, as previously described, and detected in the video controller 34 from the third enable signal 34n, the display will proceed to its next task of drawing the first desired horizontal line, such as that shown in FIG. 2A.

In order for the first horizontal line to appear on screen 16, the information contained in memory locations 1-4 shown in the memory map must first be retrieved or "read" from the horizontal memory 24 and stored at appropriate places. Specifically, in response to a next enable signal 34n, the memory address generator 27 will generate a next sequence of address commands 27a to cause transfers of data from horizontal memory 24 as previously described. The number of increments or dots per horizontal line, "11", contained in memory location 1, will be delivered on horizontal memory output 24a to line length register 29. In like manner, the number of horizontal lines desired ("6") is retrieved from memory location 2 in response to a next address command 27a and delivered to number of line counter 30 on horizontal memory output 24b. The beginning X and Y axis coordinates (0, 0) for the first line are retrieved from locations 3 and 4, respectively, from horizontal memory 24, and are hereafter delivered to a suitable X hold register 31 on horizontal memory output 24c and to line scroll generator 33 on horizontal memory output 24d. For purposes of simplifying explanation of the present invention, it will be assumed, for the moment, that until the scrolling feature is performed, horizontal memory output 24d will be passed directly through line scroll generator 33 on line scroll generator output 33a. When the last such retrieval has been completed, as detected by video controller 34 from enable signal 34n, a series of register transfer commands 34a, b, and c, generated by video controller 34 will cause transfer of the numbers stored in their respective registers 29, 31, and 32, to their respective counters. Specifically, line length register 29 will thus transfer its stored number on line length register output 29a to line length counter 35, X register 31 will transfer its number on X register output 31a to X counter 22, and Y register 32 will transfer its number on Y register output 32a to Y counter 23. After the various counters have thus been set up in the manner just described, X counter 22 will deliver the digital representation of its coordinate ("0") stored in X hold register 31 on counter output 22a to a conventional X axis digital-to-analog converter 19 for conversion to analog form. After such conversion, the analog equivalent to this X coordinate will be delivered as horizontal deflection signal 19a to position the beam 17a of the display at the appropriate horizontal location for the first point of the first horizontal line. In like manner, Y counter 23 will deliver on counter output 23a the digital representation of the beginning Y coordinate ("0") of the first desired horizontal line stored in Y hold register 32 to a conventional Y axis digital-to-analog converter 20 which, after converting this digital word to analog form, will position the beam 17a at the appropriate beginning Y coordinate. Each time the intensity signal 17a is thus "aimed" at an X, Y coordinate location wherein a dot of light is desired, the video controller 34 will "decode" or sense this state. This is because the rate at which the X and Y counters 22 and 23 are incremented, or in other words, the rate at which new X, Y coordinate pairs are generated is controlled by video controller 34 since it generates increment signals 34g and 34f, respectively, to increment the counters 22 and 23. Each time a new coordinate pair is thus generated and the equivalent analog voltage appears on horizontal and vertical deflection signals 19a and 20a, respectively, the video controller 34 will generate an intensity control signal 21, causing the electron beam 17a to create a light dot on the face of the screen 16 at the desired location correlative to the particular X, Y coordinate.

Unlike the Y counter 23, however, which will maintain a constant output "0" corresponding to the value of memory location 4, X counter 22 will then begin counting up from the initial X coordinate "0" stored in the X hold register 31. Each time the X counter 22 is incremented in response to X increment signal 34g, this causes a correlative and discreet increase in X axis deflection signal 19a which, in turn, causes the beam 17a to move to the right by a corresponding discreet amount while remaining at the previous Y coordinate. It will be recalled that in order to define the length of a particular line it was necessary to define the number of dots or increments per line which were desired, and that this number was presented to the line length register 29. Each time the X counter 22 is incremented, thus moving the beam to the right one step, the line length counter 35 is correspondingly incremented by line length increment signal 34h. When the line length counter 35 reaches the number "11" corresponding to the fact that the X counter 22 has caused the last dot of the first horizontal line to be drawn, and thus the line has been completed, this will be detected on signal 34h by controller 34 and the number of lines counter 30 will accordingly be decremented by 1 in response to number of lines counter signal 34l and will now hold the value "5" indicating five horizontal lines remain to be drawn. Accordingly, the Y coordinate for the second horizontal line ("2") will then be read from memory location 5 contained in the horizontal memory 24, and this information with thereafter be transferred to the Y counter 23 in the manner previously described. In the illustrated embodiment of the display, although not required, lines in a given direction may desirably be of the same length and begin at the same axis coordinate to which they are parallel, as hereinbefore noted. Accordingly, it will be appreciated that for the second horizontal line, the digital representation of the number of dots per line contained in the line length register 29, as well as the initial X coordinate of the second line contained in X register 31 will be identical to that of the first line, and only need be transferred to their respective counters 35 and 22 as previously described in preparation for drawing the second horizontal line. The second horizontal line will be drawn in a manner similar to that of the first line, with line length counter 35 and X counter 22 incrementing each time a dot is drawn. This process will continue for each desired horizontal line, wherein prior to drawing each successive line, the number of lines counter 30 is decremented by 1 and the appropriate Y coordinate for the new line is read from one of the remaining memory locations 6-9. It will be appreciated that when both the line length counter 35 reaches the number "11" stored in line length register 29 and the number of lines counter 30 has reached "0", the last dot of the last horizontal line has been drawn, as sensed by the controller 34 on signals 34h and 34l, and the video controller 34 is thereby ready to perform its next function of drawing vertical lines.

In summary, it may be appreciated that the video controller 34 is continually in alternating states wherein it commands the various registers and counters to be first appropriately "set up" with necessary information, and this information is thereafter used secondly to write the desired information on the screen 16. Moreover, with respect to the writing of horizontal lines, the video controller 34 detects two states. First, it determines when the line length equals "11" and the number of lines remaining does not equal "0", in which case the video controller 34 will set up counters 35, 22, and 23 to draw the next line. Secondly, the video controller 34 will determine when both the increments per line remaining as well as the number of lines to be drawn remaining equal 0, in which case the function of drawing the horizontal line has been completed, causing the video controller 34 to begin to set up the various registers and counters to perform the next function of drawing vertical lines. From inspection of the information stored according to the manner previously described in memory locations 10-13 of vertical memory 25 related to the drawing of vertical lines, it will be appreciated that the manner in which this second function of the display is accomplished is similar to that performed in drawing horizontal lines, as previously described. More particularly, however, with the exception of the scrolling of horizontal lines to be hereinafter described, the basic steps performed to draw vertical lines is identical to that of horizontal lines with two exceptions. First, instead of holding a Y counter output 23 constant for a given line while the X counter 22 is incremented, for vertical lines this situation is reversed wherein for each line the X counter 22 is held at a constant value while the Y counter 23 is incremented. Secondly, in the image illustrated in FIG. 2A, only one vertical line is depicted which is reflected in the fact that unlike in memory locations 5-9 wherein Y coordinates for successive horizontal lines are stored, no such correlative X coordinates other than the first stored at memory location 13 are present. This corresponds to the fact that for purposes of illustration only one vertical line was generated. However, it will be apparent that by providing in suitable memory locations additional X coordinates of successive vertical lines, they may be drawn in a manner analogous to that of the horizontal lines.

Figure 4:
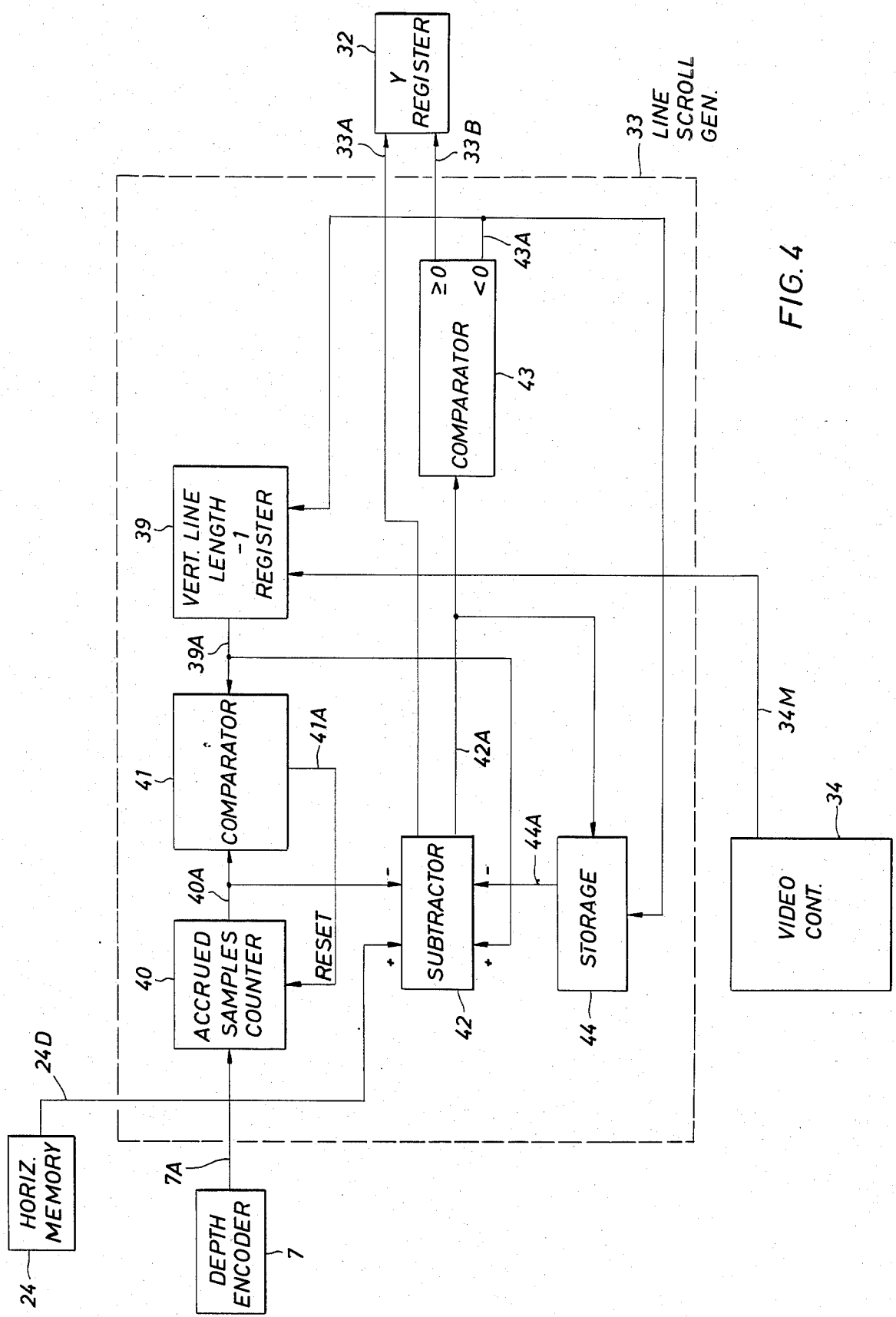
FIG. 4 is a more detailed functional representation of another different selected portion of the structures depicted generally in FIG. 1.

Unlike the method for scrolling log curves to be described, wherein the address commands 28a to the log memory 26 are adjusted in relation to derivation of new measurements, the depth lines are made to appear to scroll by adjusting their Y coordinates after they are read from the horizontal memory 24 in relation to the derivation of the new measurements. Referring now more particularly to FIG. 4, there will be seen a vertical line length register 39. When the video controller 34 is preparing to draw depth lines, a number 1 less than the number of log measurements to be displayed stored in memory location 14 of vertical memory 25, will be transferred to the register 39 on video controller output 34m. In the example of FIG. 2A, this number will, of course be "10". There will also be seen in FIG. 4 an accrued sample counter 40, which, in response to each depth increment signal 7a, will generate a digital number on counter output 40a, which is 1 higher than that previously generated, until the number on the counter output 40a equals that of the register output 39a of register 39. This event may be conveniently detected by a comparator 41, which continuously compares the counter output 40a and the register output 39a. When it occurs, the comparator 41 will generate a comparator output 41a, thus resetting the counter 40 to the number "0", which will also always be the value that the counter 40 will be preset to prior to display of the depth lines. Thus, it will be noted that with each newly derived log measurement, indicated by the depth increment signal 7a, a number on the counter output 40a will be generated, and will increment by 1 with each new measurement starting at "0" until the number "10" is reached, at which time the counter 40 will reset to "0". Still referring to FIG. 4, there will be seen a subtractor 42. Each time a Y coordinate of a depth line is read from the horizontal memory 24, this number will be delivered on the horizontal memory output 24d to the subtractor 42, and then subtracted from the number then present at the counter 40a output. The subtractor 42 will then generate a subtractor output 42a which is the numerical difference between these numbers, and deliver this difference to a comparator 43 and to a storage 44. The comparator 43 will then determine whether the difference is less than 0. If it is not, then the difference will be delivered as a comparator output on the line scroll generator output 33b to the Y register 32 and will be the Y coordinate value used to generate the particular depth line in a manner previously described. However, if the difference in the comparator 43 is less than 0, the comparator 43 will generate a comparator output 43a which will cause the number previously stored in the storage 44 to transfer to subtractor 42 on the storage output 44a. The comparator output 43a will also cause the number stored in the register 39 to be transferred to the subtractor 42 on the register output 39a. The subtractor 42 will then subtract the number delivered from the storage output 44a from the number delivered from the register 39, and thus generate the result as the line scroll generator output 33a. The line scroll generator output 33a will, in like manner to the line scroll generator output 33b, then be used as the Y coordinate value to generate the particular depth line, also in a manner previously described.

A numerical example at this point will be helpful in illustrating the manner in which the depth lines are made to appear to scroll. Referring to FIG. 2A, it will be recalled that six depth lines have been generated, the first from the bottom corresponding to a depth of 18 feet and a Y coordinate of "2". It will be assumed that between the time at which the image of FIG. 2A and FIG. 2B have successively been displayed, a new log measurement dot shown as measurement 13 has been generated from a depth of 9 feet and is ready to be displayed. Accordingly, it will further be appreciated that as this measurement 13 appears in the display of FIG. 2B, the depth line at 18 feet must be moved downward by one space to a Y location of "1" to thus simulate the traversal of the sonde 1 by 1 foot further up the borehole. Referring to FIG. 4, it will thus be seen that when the display is preparing to draw the 18 foot depth line illustrated in FIG. 2B, the number "2", corresponding to the Y location of the first depth line from the bottom shown in FIG. 2A and stored in memory location 5, will be presented to the subtractor 42 on horizontal memory output 24d. Still further, because the accrued samples counter 40 has received one pulse on depth encoder output 7a, corresponding to the fact that one additional measurement has been derived, accrued samples counter 40 will have present on counter output 40a the number "1". As previously described, the subtractor 42 will determine the difference between these two numbers and transmit this difference, which is "1" on the subtractor output 42a to the comparator 43. As previously described, because this difference is not less than 0, the number "1" will be transmitted as line scroll generator output 33b to the Y register 32 as the adjusted new Y coordinate for the depth line appearing at 18 feet. Accordingly, it will be seen from FIG. 2B that the depth line appearing at 18 feet will thus be displayed at a new Y coordinate value of "1", causing this line to appear to scroll downward in relation to its previous location shown in FIG. 2A. If it is assumed that three new log measurements have been derived, and thus the accrued samples counter 40 has not yet been reset to "0", the counter output 40a will present the number "3" on counter output 40a to the subtractor 42. However, the number "2" will be delivered on the horizontal memory output 24d to the subtractor 42, as it will be recalled that the Y coordinate of a particular depth line will always remain at the value assigned it when initially stored in the horizontal memory 24. The subtractor 42 will then, as before, determine the difference between these numbers and deliver the result on the subtractor output 42a to the comparator 43. In this particular case, the difference between "2" and "3" will be "−1". It will be recalled that this difference of "−1" will also be delivered to the storage 44. The comparator 43, after determining that the difference is less than 0, will instruct the register 39, in response to comparator output 43a to deliver the register output 39a, which will be the number "10" to the subtractor 42. The comparator output 43a will also cause the storage 44 to deliver the number "1" on storage output 44a to the subtractor 42. The subtractor 42 will then determine the difference between register output 39a, which is "10" and the storage output 44a which is "1", and will deliver the result, which is "9" on the line scroll generator output 33a. This Y coordinate value of "9" will thus be used as the new Y coordinate value for the depth line of 18 feet, shown in FIG. 2B, after three more measurements have been derived. It will be appreciated that this new location of the 18 foot depth line at a Y coordinate value of "9" coincides with the location of the depth line shown at a depth of 10 feet in FIG. 2B. It will thus be appreciated that the new effect of adjusting Y coordinate values of the depth lines is to cause the depth lines to move downward or scroll until they reach the bottom of the display, at which time they will reappear at the top of the display and continue to move downward in functional relationship to the receipt of new logging measurements.

Referring now to the function of displaying and scrolling logging curves performed by the present invention, it will be recalled that prior to the display of images, it was necessary to provide certain information regarding the desired general appearance of the images through means of a teleprinter 2 or the like. It will also be recalled that in particular, this information included that shown in memory locations 14–16 regarding the drawing of logging curves, and that this information was stored in the log memory 26 in a manner previously described in response to address commands 27c generated by the memory address generator 27. When the display is performing the function of drawing curves, this data must be retrieved from the log memory 26 and stored in appropriate registers and counters for similar reasons as when the grid lines are being drawn. Specifically, when the video controller 34 has determined that the last vertical line has been drawn in a manner previously described, and it is thus time to begin drawing the logging images, enabling signal 34n will cause the address generator 27 to generate appropriate address commands 27c so as to cause the vertical log curve length number "11", stored in memory location 14, to be transferred on log memory output 26a to line length register 29. In like manner, the number of curves, "1", stored in memory location 15 will be transferred on log memory output 26b to the number of lines counter 30, and the Y coordinate of the beginning of the log curve, "0", stored in memory location 16, will be transferred on log memory output 26d to the Y register 32. When this data has thus been retrieved and transferred, logging curves will thereafter be displayed and scrolled in a manner to be described.

Referring now to the following Table IIA, there will be seen a reproduction of a portion of the previously illustrated memory map of Table I related to the image 9a of vertical logging curve measurements depicted in FIG. 2A.

previously described. Simultaneously, correlative Y values will be generated for each such X value and presented as vertical deflection signal 20a so as to cause the X values to appear at the proper elevations on screen 16. Beam 17a will then be turned on and off to illuminate the dot corresponding to the particular X, Y pair. Because the X values will preferably be read in order from the deepest derived to shallowest, as previously stated, it is only necessary to cause Y counter 23 to present a "0" value to the vertical converter 20 correlative with the reading of the first X value and its conversion by horizontal converter 19, and to thereafter

TABLE II

| | A | | | | | | | | B | | |
|---|---|---|---|---|---|---|---|---|---|---|---|
| (a) MEMORY LOCATION | (b) (Y =) | (c) DEPTH (FT.) | (d) | (e) | (f) MEASUREMENT | (g) (X =) | (h) | (i) DEPTH (FT.) | (j) MEASUREMENT (X =) | (k) Y = |
| 17 | 10 | 10 | 0 | 0 | 0 | 0 | 1 | 10 | 1 | 9 |
| 18 | 9 | 11 | 0 | 0 | 0 | 0 | 3 | 11 | 3 | 8 |
| 19 | 8 | 12 | 0 | 0 | 0 | 0 | 5 | 12 | 5 | 7 |
| 20 | 7 | 13 | 0 | 0 | 0 | 0 | 4 | 13 | 4 | 6 |
| 21 | 6 | 14 | 0 | 0 | 0 | 0 | 3 | 14 | 3 | 5 |
| 22 | 5 | 15 | 0 | 0 | 0 | 0 | 2 | 15 | 2 | 4 |
| 23 | 4 | 16 | 0 | 0 | 0 | 0 | 1 | 16 | 1 | 3 |
| 24 | 3 | 17 | 0 | 0 | 0 | 0 | 2 | 17 | 2 | 2 |
| 25 | 2 | 18 | 0 | 0 | 0 | 3 | 3 | 18 | 3 | 1 |
| 26 | 1 | 19 | 0 | 0 | 4 | 4 | 4 | 19 | 4 | 0 |
| 27 | 0 | 20 | 0 | 5 | 5 | 5 | 5 | 9 | 3 | 10 |

As can be seen from columns (c) and (d) of the table, when a logging operation is begun, memory locations 17–27 reserved for storing measurements in log memory 26 will have "0" values stored, corresponding to the fact that no measurements have been taken. However, as the sonde 1 progresses up the borehole, taking successive measurements, as indicated in columns (e) through (h), they will be stored successively in memory locations 27, 26, and so forth, until all memory locations allotted to logging measurement storage have been occupied, as shown in column (h). Thereafter, as illustrated in column (j) of FIG. 2B, once all memory locations have been filled, each successively derived measurement will be stored in a memory location occupied by the measurement which was previously derived from the deepest location within the borehole. For example, as shown from columns (i) and (j) of Table 2B, a measurement having the value "3" derived from a depth of 9 feet has been stored in memory location 27, thus replacing the previous measurement of "5" derived at a 20 foot depth. This corresponds to the measurement 13 shown in FIG. 2A. This process will be repeated as new measurements are derived at progressively shallower depths, wherein measurements at 8 feet replace those of 19 feet and are stored ion memory location 26, measurements at 7 feet replace those at 18 feet and are stored in memory locations 25, and so forth. It will be appreciated that every time the last measurement replaced is at memory location 17, the next memory location to be filled will be memory location 27. The process will thus "recycle" and continue, wherein measurements in successively lower memory locations are replaced.

The method whereby images of logging measurements are thus made to appear may now be seen. Whenever an image of a logging curve such as that of FIG. 2A is desired, several things must occur. First, every logging measurement X coordinate value will be read from log memory 26 in sequence from the deepest derived measurement to the shallowest, and then be converted to horizontal deflection signal 19a in a manner increment Y counter 23 with each corresponding successive reading of the next X value. In this manner, images such as those of FIGS. 2A and 2B may thus be produced, wherein dots in a given image will be drawn starting with the lowest dot on the screen 16, and corresponding to the deepest derived measurement, and progressing upwardly as successive dots are drawn.

In order to achieve the illusion of scrolling of logging images, it should now be apparent that only two additional requirements are necessary. First, it will be necessary to provide a technique for generating at the appropriate times when a newly derived measurement is to be stored, address commands correlative to the memory location of the deepest derived measurement presently stored in log memory 26 so as to cause this newly derived measurement to replace the deepest derived measurement, as previously explained. Moreover, it will further be necessary when all logging measurements are successively read from log memory 26 and displayed, to provide a technique for generating a sequence of address command numbers correlative to the memory location numbers wherein the measurements to be displayed are stored, and further correlative to the order in which these measurements will be displayed. For example, in order to draw the image of the log curve 9a shown in FIG. 2A, measurements stored in memory locations 17–27 will be sequentially read from log memory 26 and displayed in order from memory location 27 to 17, and accordingly a sequence of address commands numbered in order from 27 to 17 must be generated. In like manner, in order to generate the image of the log 9b depicted in FIG. 2B, memory locations 26 through 17 and 27 must be sequentially read and displayed in order with correlative Y values from "0" to "10". Accordingly, a sequence of numbered address commands 26–17 and 27 must be generated.

Figure 3:
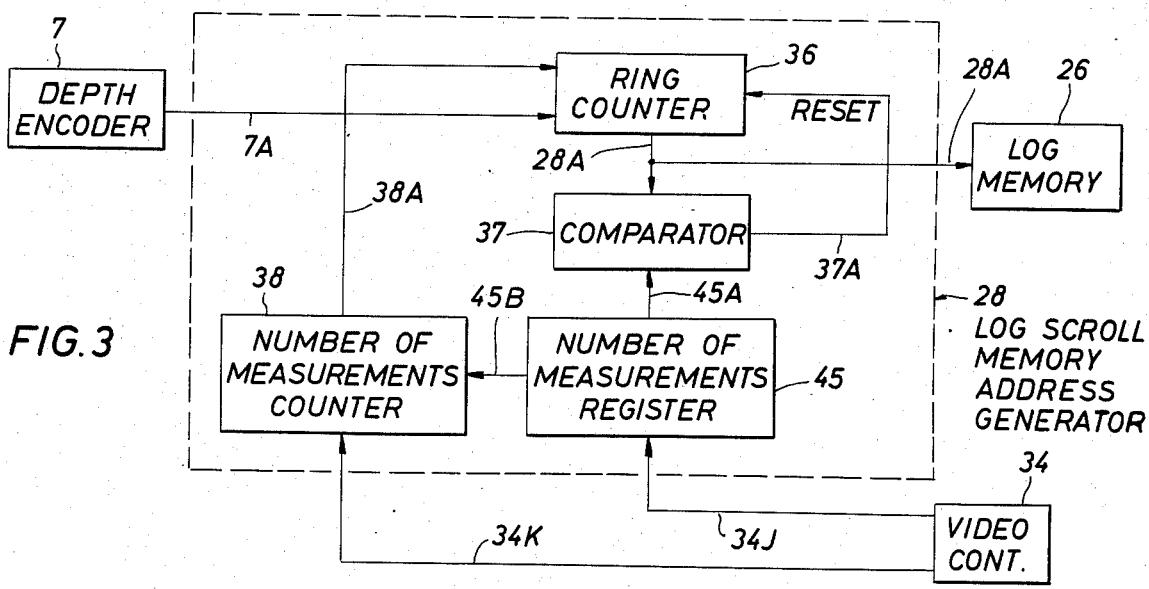
FIG. 3 is a more detailed functional representation of a selected portion of the structures depicted generally in FIG. 1.

Referring now to FIG. 1, there will be seen a log scroll memory address generator 28 for providing these required address commands 28a. For storing and retrieving measurements, as each measurement from the sonde 1 is derived, processed by the controller 3, and made available on controller output 3c for storage in the log memory 26, the address generator 28 will generate an appropriate numbered address command 28a to cause the measurement to be stored in the proper memory location of logging memory 26 as described. In like manner, as each image of a log curve such as log 9a of FIG. 2A is drawn on the screen 16, the address generator 28 will also generate a sequence of such numbered address commands 28a so as to cause the measurement stored in each memory location 17–27 to be read out on log memory output 26d and displayed in the proper order as also described. In FIG. 3 there may be seen a more detailed representation of the address generator 28 for generating address commands 28a. Address command generator 28 will preferably have a number of measurements register 45 wherein there will be stored the total number of log measurements or dots to be displayed for a given log, or in the case of the illustrative log 9a depicted in FIG. 2A, the number "11". Address command generator 28 will also preferably have a suitable ring counter 36. Ring counter 36 will be designed to preset prior to operation of the display so as to produce the digital word equivalent to the highest numbered memory location on its address command 28a output, or "27" in the case of the previously illustrated memory map of Table I. The ring counter 36 will further be designed to produce a sequence of successively lower digital numbers at its output 28a, wherein each successive number is generated in response to either a depth increment signal 7a or a counter output 38a. There will also be seen in FIG. 3 a comparator 37 which will generate a reset signal 37a resetting the ring counter 36 to its preset value "27" when the digital number presented to the comparator 37 on address command 28a from the ring counter 36 is equal to the digital word presented to the comparator 37 on the register output 45a from the register 45. In other words, the numbers present on address command 28a will be successively lowered by 1 in response to either a depth increment signal 7a or counter output 38a until the address command 28a equals the number "11" which will be the register output 45a, whereupon the ring counter 36, in response to reset signal 37a, will be reset to its preset value "27". Thus, it may be seen how an appropriate address command 28a is always generated from the ring counter 36 so as to store logging measurements in their proper memory location after they are derived. Referring to columns (a) and (e) of Table IIA above, it will be seen that the first derived measurement of FIG. 2A, the number "5" must be stored in memory location 27. Depth encoder 7 will accordingly generate a first depth increment signal 7a causing the ring counter 36 to generate its first address command 28a, or the number "27" which it was preset to. Accordingly, when the measurement "5" is present on controller output 3c, it will thus be stored in memory location 27 of the log memory 26 in response to the address command 28a carrying the number "27". Each time a new measurement is made at successively shallower depths, a depth increment signal 7a will cause the ring counter 36 to generate successively lower numbered address commands 28a correlative to successively lower numbered memory locations, so as to cause each newly derived measurement to be stored in its appropriate memory location of the log memory 26, as shown in column (h) of Table IIA. Moreover, when the last available memory location 17 has been utilized, the next depth increment signal 7a will cause the ring counter 36 to reset to the value "27". This will generate an address command 28a of the value "27" so as to store this next derived measurement 13 of FIG. 2A in the memory location 27 wherein previously the deepest derived measurement 14 of FIG. 2A was stored, as shown in column (h) of Table IIA and as previously discussed. Referring now to the generation of an appropriate sequence of address command 28a numbers in order to readout measurements stored in the log memory 26 in the proper order for subsequent display, there will be seen in FIG. 3 a number of measurements counter 38. When the video controller 34 is ready to perform the function of drawing the logs such as log 9a of FIG. 2A, the video controller 34 will generate a log command signal 34j causing the register 45 to transfer on register output 45b to counter 38 the number stored in register 45 which is "11", the number of measurements which are to be displayed. The video controller 34 will then generate a next log command signal 34k which, in turn, will cause the counter 38 to generate a series of 11 signals on counter output 38a, each of which will cause the ring counter 36 to generate an output 28a correlative to memory locations which will be one less than that previously generated by the ring counter 36, unless the previous number was "17", in which case the ring counter 36 will generate a next address command 28a of the value "27", after resetting in the manner previously described. Thus, it will be seen that in this manner a sequence of address command 28a numbers for each memory location will be generated wherein the first memory location number on address command 28a will be that location where the deepest derived measurement is currently stored in log memory 26, and wherein the last such number will be the memory location wherein the shallowest derived measurement is stored. For example, regarding the log curve 9b depicted in FIG. 2B, address command 28a numbers 26–17, and 27 will be generated in sequence, and their respective measurements in the correlative memory locations also displayed in sequence, starting at the bottom of the screen 16, as shown in Table IIB. It will also be seen that if, in the time between two successive complete displays of a logging curve image no additional measurements have been taken, each series of address command 28a numbers used to readout and display all measurements contained in memory locations 17–27 will be identical. In other words, in the display of log 9a of FIG. 2A, address command 28a numbers 27 through 17 will be generated each time the log 9a is displayed. However, after the measurement at 9 feet is made and stored in log memory 27, the log 9b of FIG. 2B will be displayed, wherein the address command 28a numbers will change in sequence to 26 through 17 followed by 27 each time the log 9b is displayed until additional measurements are derived.

What is claimed is:

1. A method of generating on a viewing screen a continuously scrolling display of a logging curve and a depth line in relation to movement of a logging instrument within a borehole, comprising:

generating digital representations of first coordinate pairs, each corresponding to a point on said curve;

generating digital representations of second coordinate pairs, each corresponding to a point on said line;

sequentially positioning an electron beam in response to said digital representations at first and second discrete locations on said screen corresponding to each said first coordinate pair s;

sequentially positioning an electron beam in response to said digital representations at second discrete locations on said screen corresponding to each said second coordinate pairs;

intensifying said beam when positioned at said first and second discrete locations to generate a first display of said curve;

intensifying said beam when positioned at said second discrete locations to generate a first display of said line;

generating digital representations of third coordinate pairs each comprising:

an x coordinate from one of said first pairs; and the corresponding y coordinate from said one of said first pairs modified by a preselected magnitude;

generating digital representations of fourth coordinate pairs each comprising:

an x coordinate from one of said second pairs; and the corresponding y coordinate from said one of said second pairs modified in response to said digital representations of third coordinate pairs;

sequentially positioning said electron beam in response to said digital representations of third coordinate pairs at third discrete locations on said screen corresponding to each said third coordinate pair;

sequentially positioning said electron beam in response to said digital representations of fourth coordinate pairs at fourth discrete locations on said screen corresponding to each said fourth coordinate pair;

intensifying said beam when positioned at said third locations to generate a second display of said curve whereby said second display of said curve is displaced relative to that of said first display of said curve by a distance corresponding to said magnitude; and intensifying said beam when positioned at said fourth locations to generate a second display of said line whereby said second display of said line is displaced relative to that of said first display of said line in response to the displacement of said second display of said curve.

2. The method of claim 1, wherein said generating said digital representations of second coordinate pairs corresponding to points on said depth line comprises:

storing a digital representation of an x and a y coordinate corresponding to a starting point on said screen for said line;

storing a digital representation of a number corresponding to the length of said line on said screen;

retrieving said digital representation of said x coordinate;

retrieving said digital representation of said y coordinate and said number; and loading said digital representation of said x coordinate into a counter; and incrementing said counter from said x coordinate to said number.

3. Apparatus for generating on a viewing screen a scrolling display of a curve from a logging tool in a borehole and a depth line, comprising:

means for generating a plurality of first digital representations of first x,y coordinate pairs each comprised of an x and a y coordinate and corresponding to a point on said line, wherein said means for generating said plurality of first digital representations includes:

means for storing an electrical digital representation of an x and a y coordinate corresponding to a starting point on said screen for said line;

means for storing an electrical digital representation of a number corresponding to the length of said line on said screen;

means for retrieving from said storage said digital representations of said x and y coordinate corresponding to said starting point and said number;

digital counter means for generating a sequence of digital representations corresponding to x coordinates of said line;

means for setting said counter means to said digital representation of said x coordinate corresponding to said starting point; and means for incrementing said counter means from said digital representation of said x coordinate corresponding to said starting point to said number means for generating a plurality of second digital representations of x,y coordinate pairs each comprised of an x and a y coordinate and corresponding to a point on said curve, wherein said means for generating said plurality of second digital representation includes:

means for storing a digital representation of an x and a y coordinate corresponding to a starting point on said screen for said line;

means for storing a digital representation of a number corresponding to the length of said line of said screen;

means for retrieving from said storage said digital representations of said x and y coordinate corresponding to said starting point and said number;

digital counter means for generating a sequence of digital representations corresponding to x coordinates of said line;

means for setting said counter means to said digital representation of said x coordinate corresponding to said starting point; and means for incrementing said counter means from said digital representation of said x coordinate corresponding to said starting point to said number means for sequentially positioning an electron beam at discrete locations on said screen corresponding to said first and second coordinate pairs in response to said first and second digital representations;

means for intensifying said beam when positioned at said discrete locations;

means for modifying each of said first digital representations of said y coordinates by a preselected magnitude corresponding to movement of said tool in said borehole; and means for modifying each of said second digital representations of said y coordinates in response to said modification of said first digital representations of said y coordinates.

* * * * *